United States Patent

[11] 3,576,552

[72] Inventor Albert W. Vinal Owego, N.Y.
[21] Appl. No. 693,409
[22] Filed Dec. 26, 1967
[45] Patented Apr. 27, 1971
[73] Assignee International Business Machines Corporation Armonk, N.Y.

[54] CYLINDRICAL MAGNETIC MEMORY ELEMENT HAVING PLURAL CONCENTRIC MAGNETIC LAYERS SEPARATED BY A NONMAGNETIC BARRIER LAYER
10 Claims, 5 Drawing Figs.

[52] U.S. Cl. ... 340/174
[51] Int. Cl. ... G11c 11/14
[50] Field of Search ... 340/174; 307/88

[56] References Cited

UNITED STATES PATENTS

| | | | |
|---|---|---|---|
| 3,451,793 | 6/1969 | Matsushita | 340/174X |
| 3,480,929 | 11/1969 | Bergman | 340/174 |
| 3,188,613 | 6/1965 | Fedde | 340/174 |
| 3,193,694 | 7/1965 | Ehresman et al. | 307/88 |
| 3,358,273 | 12/1967 | Henninger et al. | 340/174 |
| 3,370,979 | 2/1968 | Schmeckenbecker | 340/174X |
| 3,375,091 | 3/1968 | Feldtkeller | 340/174X |
| 3,440,626 | 4/1969 | Penoyer | 340/174 |
| 3,516,076 | 6/1970 | Stein | 340/174 |
| 3,518,639 | 6/1970 | Feldtkeller et al. | 340/174 |
| 3,518,641 | 6/1970 | DeChanteloup | 340/174 |
| 3,488,167 | 1/1970 | Chang et al. | 29/196.1 |

OTHER REFERENCES

IBM Technical Disclosure Bulletin, " Coupled Film Memory" by Louis, Vol. 7, No. 6, 11/64, pgs. 483— 484, copy in 340- 174 Keeper.

Text: Magnetic Thin Films, by Soohoo; Harper & Row Publishers; pages 141— 143, copy in Group 230, Scientific Library, Dec. 7, 1965.

*Primary Examiner*—Stanley M. Urynowicz, Jr.
*Attorneys*—Hanifin and Jancin and John S. Gasper

ABSTRACT: A cylindrical magnetic film memory element. Plural concentric film layers are deposited on a cylindrical substrate. The substrate is either a solid conductive cylinder such as a wire or rod, or is a composite cylinder comprising a conductive film deposited on a solid or hollow nonconductive tube support. The magnetic films are either all anisotropic or mixed anisotropic and isotropic. In one embodiment, the anisotropic films have a closed hard axis and the easy or preferred axis of magnetization is parallel with the longitudinal axis of the substrate and the quiescent saturation magnetization within the film layers are disposed in an antiparallel longitudinal manner. In a second embodiment, dual anisotropic films have a preferred easy axis orientation circumferentially directed, thereby giving a closed easy axis.

*INVENTOR*
ALBERT W. VINAL

*BY*

*HANIFIN & CLARK*
*ATTORNEYS*

CYLINDRICAL MAGNETIC MEMORY ELEMENT HAVING PLURAL CONCENTRIC MAGNETIC LAYERS SEPARATED BY A NONMAGNETIC BARRIER LAYER

A continuous barrier layer is provided between adjacent films or groups of films. In the closed hard axis embodiment, the barrier layer serves as a means of eliminating magnetic exchange coupling between the layers. Thus, the antiparallel magnetization vectors are rotatable in the separate films or film groups in a relatively free and independent manner. The barrier layer is made of conductive material and is thick enough to support circumferential eddy currents generated when a current is applied to the substrate for read and write operations. A solenoid field parallel with the longitudinal axis of the substrate is generated by the eddy current in the barrier layer and operates to effect a phase displacement between the magnetization vectors to produce an output signal in a sense conductor layer concentrically superimposed adjacent to the outer magnetic film layer. The conductive barrier layer thickness is varied as a means for controlling the magnitude of vector phase difference and, hence, the output signal level in a bit-sense conductive means. The barrier layer may be nonconductive and the dynamic magnetic vector phase differential is obtainable if the separate films have magnetic properties such that the angular rotation rate of magnetization within the magnetic films is inherently different. The memory element has particular application in a word organized NDRO memory in which the conductive substrate is the word line and a bit or bit-sense loop is disposed concentrically with and adjacent to the outermost magnetic film area.

In the closed easy axis embodiment, the magnetization vectors are circumferentially parallel. The barrier layer between the pair of magnetic layers is preferably conductive and is relatively thin to permit transverse magnetic flux coupling between the magnetic layers, thereby preventing domain wall creep within the magnetic layers. This memory element has particular application in word organized DRO memory configurations.

DESCRIPTION OF THE PRIOR ART

Data storage devices have been devised which use discrete magnetic film elements as the storage means. The magnetic film elements have taken the form of rectangular planar films with either single or multiple layers, as well as cylindrical films on a cylindrical substrate comprised of one or more concentric magnetic layers. In all cases, the films and layers have the property of being uniaxially anisotropic and their operation as storage devices depends on the ability to rotate the direction of magnetic saturation within the films when subjected to externally controlled magnetic fields.

In the past, uniaxial anisotropic film elements have suffered from a lack of magnetic stability. The instability has been found to be attributable to the existence of relatively large demagnetizing fields within the film. In the film configurations mentioned, the demagnetizing field exhibits a component parallel to and opposite in direction to the saturation magnetization of the film. Not only does switching require increased energy to overcome this field component, but the magnetization within the film, particularly in its central region, can be disordered if the parallel demagnetizing component were to approach the value of the coercivity of the film which is characteristically low in such films. In a rectangular planar film, the demagnetizing field also exhibits components orthogonal to the anisotropic axis which leads to uncontrollable switching in the corners of the film to thereby render the film unreliable for use as NDRO storage elements. While the closed loop magnetic film has minimized the effect of the orthogonal demagnetizing field components, the parallel component still exists.

It has been found that the demagnetizing field intensity is quite nonlinear and is directly proportional to the thickness of the film and inversely proportional to film length along which magnetization is directed. Consequently, to avoid the undesirable effects of the demagnetizing fields which caused instability, the films were kept relatively thin and long. As a practical matter, such films were limited to a thickness of 1000 A. or less with a length of 30—50 mils. Such thin films, however, have characteristically exhibited low output signals when switched, and are quite sensitive to stray fields, thereby limiting their use in many DRO and NDRO applications. Likewise, applications requiring a high storage density would not be attracted to such film elements.

Not only did the demagnetizing field adversely affect the magnetostatic properties of the film, but also the dynamic properties. Relatively large drive current well controlled in amplitude was required to generate a magnetic field sufficiently strong to read out or change the state of the film since the demagnetizing field also had to be overcome in rotating the saturation magnetization within an anisotropic film from its easy axis to its hard axis of magnetization. Furthermore, the upper limit of the word drive current required to effect such switching was very restrictive, particularly with respect to NDRO operation. While dual concentric layer magnetic film elements have been devised as a means to improve switching and the output signal, switching level, switching speeds tolerance to variation in word current pulse amplitude and stray fields and thermal stability continue to be relatively poor for many applications and the overall magnetic stability has remained a problem, particularly in NDRO applications.

SUMMARY OF THE INVENTION

It is an object of this invention to provide an improved magnetic film memory element which overcomes the above-mentioned defects.

It is a specific object of this invention to provide a magnetic film memory element having improved magnetic stability which requires lower switching energy, which has improved magnetodynamic properties to attain larger response signals at higher switching speeds, and whose information state is tolerant of wide variation in word current amplitudes during energization.

It is a further object to provide a magnetic film memory element which is not thickness and length limited and which is capable of being used in high density storage arrays.

It is also an object to provide an improved magnetic film memory element which is economical to fabricate and highly reliable for use in a variety of storage applications.

It is a still further object to provide an improved magnetic film memory element capable of reliable use in both DRO, NDRO and electrically alterable read only storage applications.

It is an additional object to provide a bistable magnetic film memory element having improved stability over a relatively wide temperature variation.

The above, as well as other objects, are attained in accordance with this invention by a cylindrical memory element comprising a smooth conductive cylindrical substrate, preferably of circular cross section, carrying two or more concentric magnetic film layers separated by a barrier layer. In a first embodiment, at least one of the magnetic films is anisotropic and has a preferred direction of saturation magnetization parallel to the longitudinal axis of the substrate. The other film(s) may be isotropic or anisotropic and in the latter case, the preferred axis of magnetization is also parallel with the longitudinal axis of the substrate. In both cases, the film layers are antiparallel coupled. This antiparallel magnetic couple results in a mutual cancellation of the longitudinal (easy axis) demagnetizing field component within the films forming bits of discrete length. All hard axis demagnetizing field components are eliminated since each of the concentric magnetic layers form a closed circumferential magnetic loop giving rise to a memory element completely magnetostatically stable. The barrier layer is thick enough to eliminate magnetostatic exchange coupling between the magnetic film layers and thereby permits magnetization within the separate films to be rotated freely and independently during energization and to assume antiparallel disposition during the quiescent condition. Cancellation of all demagnetizing fields permits the use of films having thicknesses in the range exceeding 1000 A. up to 50,000 A. thereby permitting the production of relatively large readout or sense signal generation. The information states of the element correspond to the quiescent disposition of the magnetization within the top film. Magnetization within the lower film(s) always being antiparallel with respect to the top. There is no magnetostatic restriction limiting the length of the films forming the bits and a practical increase in storage density is thereby obtainable. Because all hard axis demagnetizing field components have been eliminated, relatively small drive currents can be used to effect coherent magnetization rotation and such rotation can be achieved at higher speeds.

In a first embodiment of this invention, the memory element comprises two concentric anisotropic magnetic layers with their easy axes of magnetization directed mutually parallel with the longitudinal axis of a conductive cylindrical substrate. The intrinsic anisotropy field strength of the concentric layers is preferably substantially equal and the barrier layer is conductive and of a thickness great enough to provide a circumferential shorted turn for eddy currents to flow as generated by rotation of the magnetization within the underlying films. As a result of the circumferential currents in the barrier layer, a solenoid field is generated which is parallel with the longitudinal axis of the substrate and which modifies the angular rotation rate of magnetization within the underlying magnetic film to produce a dynamic phase displacement between the rotation angles of the magnetization vectors of both layers. Since the amplitude of the output signal is directly proportional to the phase differential in the angular rotation rate of the antiparallel magnetization vectors, the conductive barrier layer provides a means for obtaining an increased signal output. In a modification of this embodiment, the concentric magnetic films have different magnetic properties so that their intrinsic anisotropy field strengths are not equal. In this condition, the rotation rate of the magnetization vectors is inherently different to produce a vector phase differential. The barrier layer may be conductive or nonconductive and, in either case, is thick enough to eliminate magnetic exchange coupling between the layers.

An additional modification of this embodiment consists of three anisotropic magnetic film layers. The first and second magnetic film layers have a combined magnetic thickness substantially equal to the magnetic thickness of the third or outermost magnetic film. Each film has its easy magnetic axis parallel with the longitudinal axis and are separated from one another by a conductive barrier layer. The magnitude of the intrinsic anisotropy fields within the magnetic films need not be identical. The magnetization vectors within the first and second film layers are oriented parallel with respect to one another and antiparallel with respect to magnetization within the outermost film layer.

In a second embodiment of this invention, the anisotropic concentric layer is combined with one or more isotropic layers mutually separated by a barrier layer. The easy axis of the anisotropic layer is once again parallel with the longitudinal axis of the substrate. Because of the magnetostatic interaction between the anisotropic and isotropic layers, an induced antiparallel magnetic couple is formed to mutually cancel the longitudinal demagnetizing field component. The barrier layer may be either conductive or nonconductive and in either event is thick enough to eliminate magnetic exchange coupling between the anisotropic and isotropic films. Because of the difference in the intrinsic anisotropic field characteristic of the films, the angular rotation rate in the films will inherently produce a phase differential. Where the barrier layer is conductive, the solenoid field effect is useful for obtaining a further change in phase differential with consequent amplification of signal output level.

In a modification of the second embodiment, the cylindrical memory element comprises an anisotropic layer sandwiched between inner and outer concentric isotropic layers with barrier layers separating the various layers. The thickness of the combined isotropic layers is at least equal to the thickness of the anisotropic layer.

In a further embodiment, the memory element comprises concentric magnetic layers each having a closed easy axis, i.e., the preferred magnetic axis, of orientation are circumferential relative to the cylindrical substrate. The magnetization vectors in the magnetic layers are parallel. A concentric barrier layer separates the magnetic layers and is preferably conductive. The thickness of the barrier layer is such that transverse magnetic flux coupling between layers is permitted thereby providing a magnetic storage element which is not sensitive, i.e., domain wall creep is prevented when the magnetic element is subjected to alternating stray field noise signal which results as part of a word organized magnetic memory.

The foregoing and other objects, features and advantages of the invention will be apparent from the following more particular description of preferred embodiments of the invention, as illustrated in the accompanying drawings.

In the drawings:

DESCRIPTION OF THE PREFERRED EMBODIMENTS

Figure 1A:
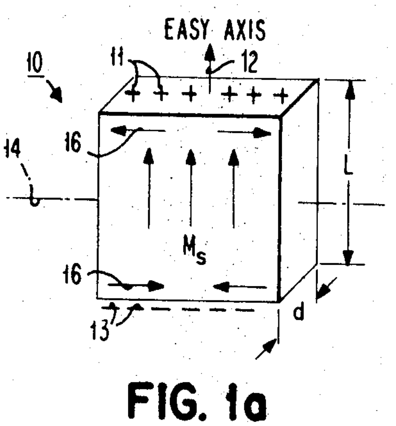
FIG. 1*a* is a schematic diagram of a planar thin magnetic film illustrating the action of the demagnetizing field $H_D$.

A problem with magnetic films of discrete length is that a demagnetizing field $H_D$ which is proportional to the thickness of the film and inversely proportional to the length of the film is developed internal to the film being most intense at the ends of the film. Films suitable for use in memories are characterized by having a relatively low coercivity $H_C$ and, consequently, $H_D$ may approach or exceed $H_c$ particularly at the extremities of the film, and render the film unsuitable for use as a reliable storage element. In FIG. 1a, there is shown a planar magnetically anisotropic thin film 10 having an easy direction or axis 12 of saturation magnetization $M_s$. The film length $L$ and thickness $d$ are finite, for example, 30 mils and 1000 A., respectively. When the element 10 is saturated in the direction shown, the element 10 may be considered to contain magnetic charge dipoles which lead to demagnetizing fields $H_D$ experienced across the length of the element. The demagnetizing field measured at the centerline 14 of the element is least intense and is defined as $H_O$. If the effect of the demagnetizing field is ignored, the external field required to rotate the magnetization vector $M_s$ 90° from the easy axis equals the intrinsic anisotropic field $H_K$. However, the actual external magnetizing field $H_W$ which must be produced by a word current $I_W$ to coherently switch a substantial portion of the element 10 because of the existence of the demagnetizing field is expressed as follows:

$$H_W=AH_O+H_K \quad \text{eq. (1)}$$

where $A$ is a constant defining position between the film center and boundary edges.

In a typical film, the term $AH_O$ may be several times larger than $H_K$.

Figure 1B:
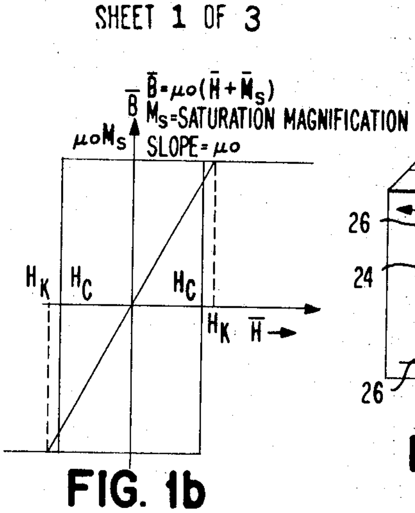
FIG. 1*b* is a graph illustrating the theoretical hysteresis properties of the anisotropic film in FIG. 1*a* where demagnetizing field effects are neglected.
Figure 2:
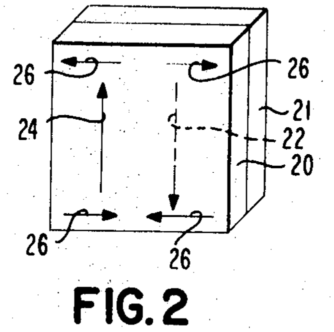
FIG. 2 illustrates a planar film improvement of FIG. 1*a*.

FIG. 1b illustrates the square hysteresis loop characteristic of an ideally magnetized film 10 which is uniformly magnetized across its area with no components of magnetization $M_s$ in any direction other than that indicated by the easy axis 12. However, because of the magnetic pole charge distribution along the top and bottom surfaces of film 10, demagnetizing fields orthogonal to easy axis 12, as indicated by the arrows 16, occur in the corner areas of film 10. These orthogonal fields cause irreversible switching of the corners of the anisotropic film when the magnetization vector $M_s$ is rotated from its easy axis toward its hard axis orthogonal to the easy axis 12. Nondestructive readout of the film is accomplished by rotating the magnetization vector $M_s$ by means of an external field $H_W$ applied orthogonal to the easy magnetic axis to produce a flux change which produces a voltage in a sense winding proximate the film. When the field $H_W$ is released, the magnetization returns to its original direction. However, the orthogonal demagnetizing fields, represented by arrows 16, will cause the magnetization in the corners of the film 10 to pass through the hard magnetic axis, thereby changing the magnetization state in portions of the film and decreasing the reliability of the nondestructive readout of the film. The orthogonal demagnetizing fields also exist where multiple planar films are superimposed, such as illustrated in FIG. 2 where films 20 and 21 are both anisotropic. The arrows 22 and 24 indicate the direction of saturation magnetization vectors within their respective films. In this configuration, the net demagnetizing field $H_D$ is substantially eliminated in each of the films except at the extremities thereof. Orthogonal demagnetizing fields still exist at the corners of the film 20 and 21 as shown by the arrows 26 and thereby produce the irreversible switching previously mentioned.

Figure 3:
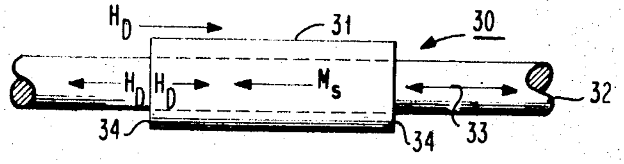
FIG. 3 shows a single layer cylindrical magnetic film memory element.

FIG. 3 shows a cylindrical memory element 30 having a single layer magnetic film 31 of finite length disposed on the surface of a cylindrical conductive filament 32. The film has uniaxial anisotropic properties with the easy axis parallel with the longitudinal axis of the conductive cylinder 32 as indicated by arrow 33. The saturation magnetization $M_S$ within the film is oriented along the easy axis. A longitudinal demagnetizing field $H_D$ exists with its direction as shown internal and external to the magnetic film layer. This demagnetizing field occurs due to the discontinuity in magnetization which occurs at the ends 34 of the film layer 31 forming its length. The intensity of this demagnetizing field varies as a function of the position within the film 31 being most intense for all positions close to the film edges 34. The film area of the type shown in FIG. 3 is unusable as a binary storage cell if the intensity of $H_D$ measured internal to the film 31 at a position equal in distance from either edge 34 is equal to the coercive force $H_C$ of the magnetic material comprising the film.

Figure 4:
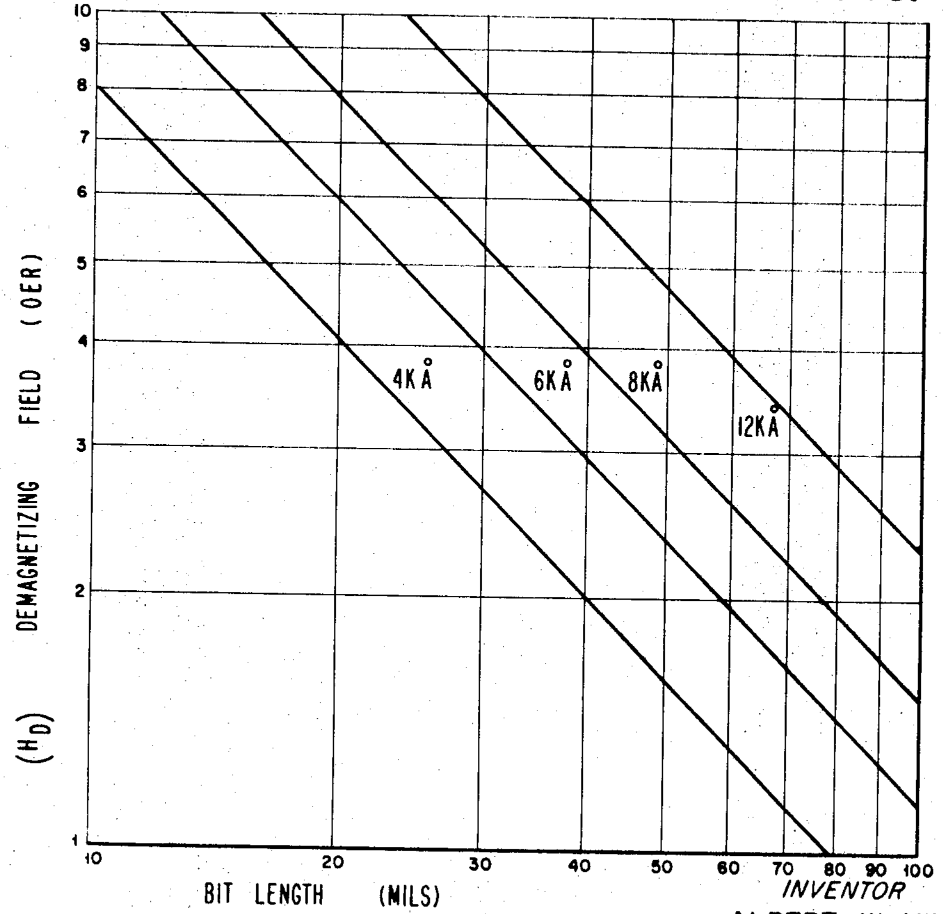
FIG. 4 is a graph illustrating the relationship of demagnetizing field and bit length for a single layer cylindrical magnetic film of various thicknesses.

FIG. 4 shows the variation of intensity of the demagnetizing field $H_D$ at the center of the cylindrical film 31 as a function of the magnetic film length and the magnetic film thickness for the values given. In FIG. 4, the saturation $M_S$ of the film 31 is assumed to be 10,000 gauss. For practical bit lengths, a single layer magnetic film 31 with axial orientation of magnetization cannot have a thickness much in excess of 1000 A. The amplitude of the response signal obtained from such a film is at most a few millivolts. One severe operative restriction is that the single layer memory element 30 fails to provide stable NDRO operation, even with ideal film properties.

Figure 5:
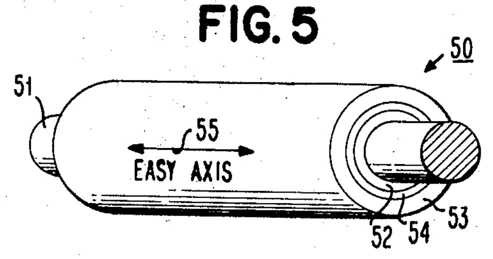
FIG. 5 is a preferred embodiment of the invention wherein two cylindrical anisotropic magnetic films are separated by a conductive barrier layer.

In FIG. 5, the memory element 50 of the invention has a conductive cylindrical substrate 51 on which are deposited a pair of concentric magnetic film layers 52 & 53 separated by a continuous nonmagnetic barrier layer 54. In the embodiment of FIG. 5, the magnetic layers 52 & 53 are both uniaxially anisotropic with their preferred or easy axis directed parallel with the longitudinal axis of the substrate 51, as shown by arrow 55. Each of the layers 52 & 53 is a magnetic material having a coercivity to anisotropy field ratio ($H_c/H_K$) within the range of 0.5 to 1.3 with a skew angle ratio less than 3° and having a magnetostriction less than 2×10'6 and preferably substantially zero magnetostriction. In the preferred embodiment, both layers 52 & 53 are of equal thickness and have equal intrinsic anisotropy fields. In such a structure, the circular cross section of the films 52 & 53 provides a closed loop or divergenceless magnetic contour which eliminates all demagnetizing fields orthogonal to the easy axis so that the net demagnetizing effect, due to orthogonal demagnetizing fields, is zero. Consequently $A$ in equation (1) is zero.

While a solid conductive filament, such as copper wire or rod, is the preferred form for substrate 51, a composite substrate having a dielectric core with a conductive surface may also be used. In addition, dielectric film layers (not shown) may be provided between the various layers and the substrate.

Figure 6:
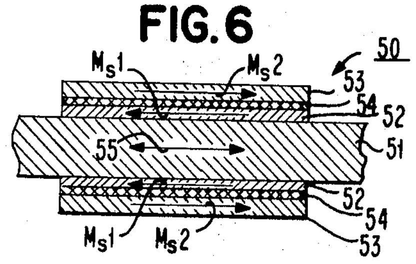
FIG. 6 is a cross-sectional view of the memory element of FIG. 5.

It is a further characteristic of the memory element 50, that the magnetic layers 52 & 53 are antiparallel magnetostatically coupled; that is, the saturation magnetization vector $M_{s1}$ of layer 52 is parallel and opposite in direction to the saturation magnetization vector $M_{s2}$ of layer 53 as shown in FIG. 6.

As a consequence of the easy axis antiparallel magnetic couple, the longitudinal self-demagnetizing fields $H_D$ generated within each of the film layers 52 & 53 become oriented so as to mutually cancel the effects of each other. This condition may be obtained independently of film thickness provided the following relationship is observed:

$$M_{s1}\times AD_1=M_{s2}\times D_2 \quad \text{eq. (2)}$$

Where $D_1$ is the thickness of film layer 52 and $D_2$ is the thickness of film layer 53.

To obtain adequate mutual demagnetization field cancellation, the thickness $D_B$ of the barrier layer 54 should be less than $5\times10^{13}\times L$, where $L$ is the length in mils of the magnetic cylindrical bit formed by the magnetic layers 52 and 53. The mutual cancellation effect is not obtainable where the layers 52 & 53 are physically in contact. In accordance with this invention, the barrier layer 54 in excess of approximately 200 A. is required.

One of the functions of the barrier layer 54 is to provide a means for substantially eliminating magnetic exchange coupling between the magnetic layers 52 & 53. An understood in connection with this invention, the term magnetic exchange coupling is meant a condition that exists as a result of a strong interaction between adjacent atomic magnetic moments within the magnetic material. The origin of this exchange coupling is believed to be the combined effect of spin-orbit interaction and exchange of coulomb interaction between neighboring orbits.

One of the effects of the exchange coupling is that a torque on neighboring dipole moments exists which opposes independent rotation of the magnetization vectors $M_{s1}$ and $M_{s2}$ of the magnetic layers 52 & 53, if no barrier layer is provided. By providing the nonmagnetic barrier layer 54, magnetic exchange coupling is prevented thereby freeing the magnetization vectors $M_{s1}$ and $M_{s2}$ for free independent rotation within their respective films. It has been found experimentally that a separation distance between film layers of 200 A. or greater is sufficient to eliminate the exchange mechanisms between the film layers.

An additional function of the barrier layer 54 in connection with this invention is to provide a dynamic solenoid field which acts to modify the angular rotation rate of the magnetization vector $M_{s1}$ within the magnetic film 52. This function requires that the barrier layer 54 not only be nonmagnetic and a conductor, but that it have a thickness great enough to permit circumferential eddy currents to be generated due to the rotation of the magnetization vectors.

Figure 7:
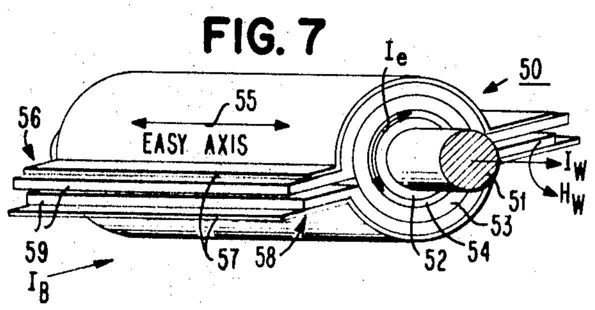
FIG. 7 illustrates the manner in which unidirectional word and bidirectional bit fields are applied to a memory element in a memory matrix.
Figure 8:
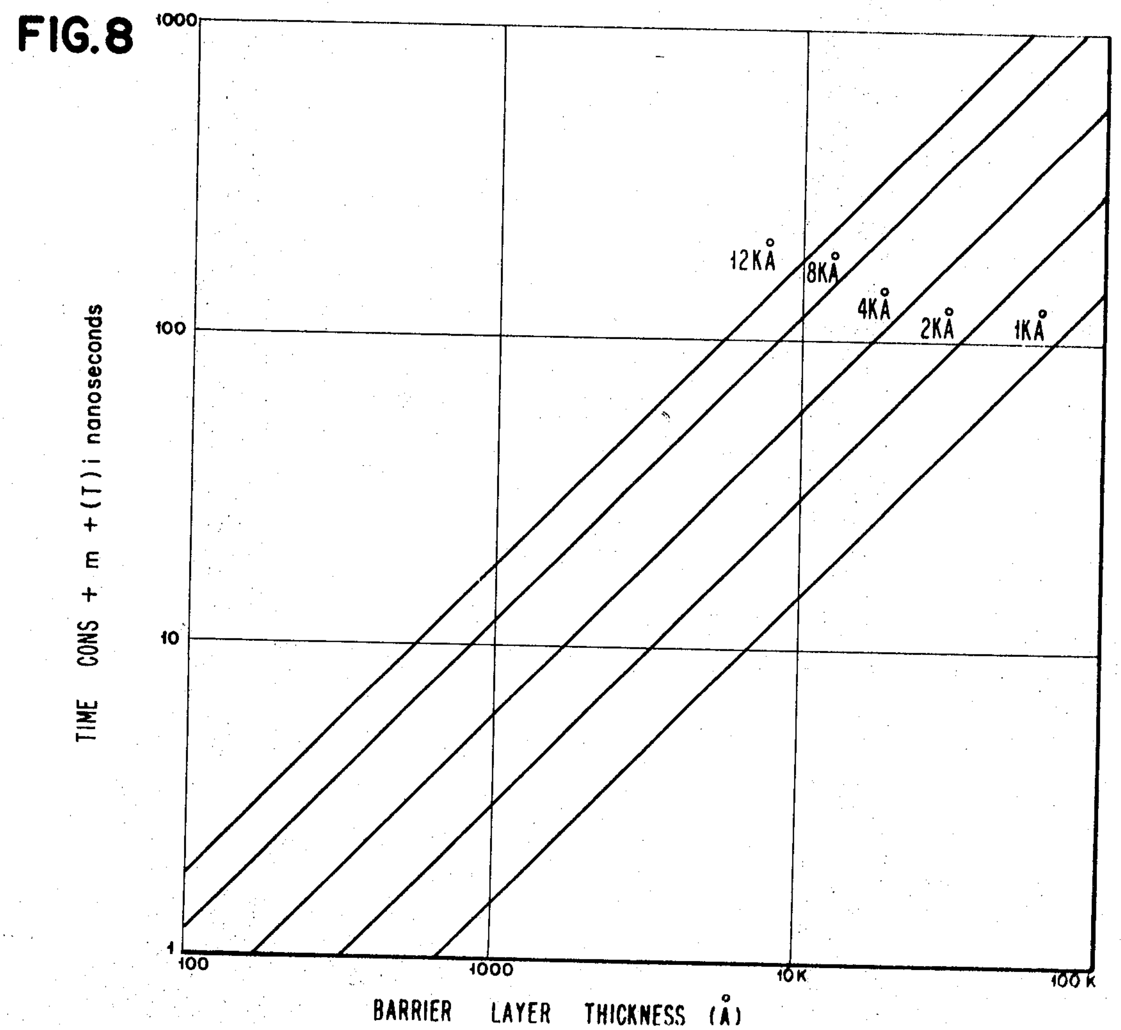
FIG. 8 is a graph showing the rotation time constant of the magnetization within the magnetic film circumscribed by the copper barrier layer. The rotation time constant is plotted as a function of barrier film and magnetic film thickness.

The principle of the solenoid field effect as a means for controlling the rotation vector $M_{s1}$ within the magnetic film 52 is better understood by reference to FIG. 7. In FIG. 7 the memory element 50 is one of a plurality of such elements forming a word organized magnetic memory array. In the array, plural discrete magnetic elements are formed at spaced locations along the substrate 51 and plural such conductors having an equivalent number of memory elements 50 are arranged in a planar array. An example of such an array is given in copending application, Ser. No. 635,072, now U.S. Pat. No. 3,487,372, issued on Dec. 30, 1969. A bit-sense loop 56 comprises conductive layers 57 and 58 preferably deposited on an insulating sheet 59. The terminals of said bit-sense loop is connected to appropriate sense amplifier and bit drive circuits (not shown). The substrate 51 is preferably a word conductor connected to a suitable energizing drive circuit which produces an axial current pulse $I_W$. The unidirectional word current $I_W$ flowing axially along the word line 51, for example, when the memory is operated NDRO, produces a circumferential magnetizing field $H_W$ which is orthogonal to the easy directions of magnetization vectors $M_{s1}$ and $M_{s2}$. The circumferential magnetic field $H_W$ causes the magnetization vectors $M_{s1}$ and $M_{s2}$ to be rotated in opposite angular directions toward their respective hard magnetic axis. The amplitude of the response signal in the bit-sense loop 56 is proportional to the time rate of change of the net magnetization encompassed by the loop, but since the magnetization vectors $M_{s1}$ and $M_{s2}$ within the film layers 52 & 53 are oriented antiparallel with each other, and due to the symmetry of the bit-sense loop, 56, the net magnetization encompassed by the loop is numerically zero where the magnetic layers 52 & 53 have identical magnetic properties. In order for a net sense signal to be generated in the conductive bit-sense loop 56, a difference in rotation rate must exist between the magnetization vectors $M_{s1}$ and $M_{s2}$ as they rotate from the easy axis 55 toward the hard axis of their respective layers. As the magnetization vectors rotate by force of the orthogonal word field $H_W$, a circumferential eddy current is induced in the barrier layer 54 which develops a solenoid field parallel to the longitudinal axis of the substrate 51 and parallel with the easy axis of the inner magnetic layer 52. The solenoid field component operates to oppose the rotation of the magnetization vector $M_{s1}$ of the inner film 52 while its effect on the rotation rate of magnetization $M_{s2}$ within the outer layer 53 is essentially negligible. The rotational velocity of the magnetization $M_{s1}$ in the inner magnetic layer 52 is thereby retarded relative to the rotational velocity of magnetization $M_{s2}$ in the outer film 53. The bit-sense loop 56, accordingly, experiences a differential in the rotation rates and a net sense signal is generated at the terminals of the bit-sense loop 56. A time constant $T$ which governs the rate of magnetization rotation is plotted in FIG. 8 as a function of the thickness of conductive barrier layer 54 for various thicknesses of magnetic layer 52. Mathematically, it has been determined that the maximum damping time constant is reached when the angular displacement of magnetization in the lower layer 52 reaches approximately 54° relative to the easy axis. For the purposes of computation, the saturation magnetization of the magnetic layer 52 was also established as 10,000 gauss and the resistivity of the barrier layer was $1.73\times10^{6}$ ohms -cm. which is the resistivity for copper. As seen in the graph of FIG. 8, for a copper barrier layer of 6000 6000 A. thick where the magnetic layers were each made of NiFe 8000 A. thick. The damping time constant is 70 nanoseconds when the lower film 52 rotates 54° from its easy axis. Some damping of the lower film 52 is produced by the second magnetic film layer 53. However, this is at least one order of magnitude less effective than the damping achieved by the copper barrier layer 54 of equivalent thickness.

In order to write a new binary state into element 50 or destructively read out the given state, bit current pulses $I_B$ are applied to bit-sense loop 56 as the magnetization vectors reach the hard axis. The bit field $H_B$ produced by $I_B$ will then cause magnetization within the anisotropic film 53 to continue rotating beyond the hard axis leading to an antiparallel disposition of magnetization vectors displaced 180° from their starting positions. By this means, the direction of the bit current determines the information state of the element. In order to achieve this state reversal, the bit field $H_B$ is caused to be terminated after the termination of the word field $H_W$.

Dynamically, the word field $H_W$ which must be applied to rotate the magnetization vector $M_s$ in order to store bits in the memory element 50 is determined by equation (1). However, the dual magnetic film structure of FIG. 7 reduces the hard axis demagnetizing field $H_D$ to zero, so that the word field $H_W$ must overcome only the intrinsic anisotropic field $H_K$ of the film 52 to rotate the magnetization vectors from the easy axis to the hard axis. Consequently, the write current $I_W$ required to produce the field $H_W$ is much less than required for prior art devices in which the effect of the hard axis demagnetizing field must also be overcome by the field produced by the word current. The elimination of $H_D$ in both hard and easy directions also permits the use of thicker magnetic films which confine more flux so that larger sense signals are produced upon switching of a film.

Figure 13:
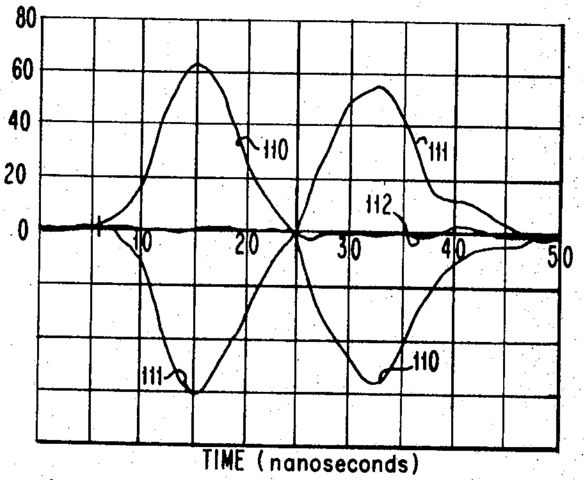
FIG. 13 is a graph of an actual signal response for a specific magnetic storage device of the type illustrated in FIG. 5.

FIG. 13 shows the peak amplitude response signals obtained from a specific example of a bistable magnetic device of the type shown in FIG. 5 which embodies the principles of the present invention. Curve 110 shows the signal response on the bit-sense line 56 (see FIG. 7) for a one data bit while curve 111 is the signal response for a zero data bit, when the rod 51 was energized with a word current pulse $(I_W)$=720 ma. with a rise time of approximately 9 nanoseconds. The one and zero curves are shown superposed for convenience in illustration. Curve 112 represents background or noise signals appearing on the bit-sense line. In the example illustrated, the magnetic device was operated NDRO where the repetition rate was 10 megacycles. In the specific example illustrated in FIG. 13, a bistable magnetic storage device was made using a 20 mil. OD polished beryllium copper rod as a conductive substrate. Deposited on the rod was a film having dual magnetic layers 80–20 NiFe each having a thickness of 12.5 KA. Both magnetic layers had a $H_C$ and $H_K$ magnitude of approximately 4.0 oersted while both had an easy axis orientation parallel with the longitudinal axis of the rod. The skew and dispersion angles for both layers was less than 1° and the magnetostriction was estimated to be in the order of less than $2\times10^{16}$. The magnetic layers were separated by a fine grain copper layer having a thickness of 12 KA. Storage bits on the substrate were formed in lengths of 60 mils by etching.

Figure 14:
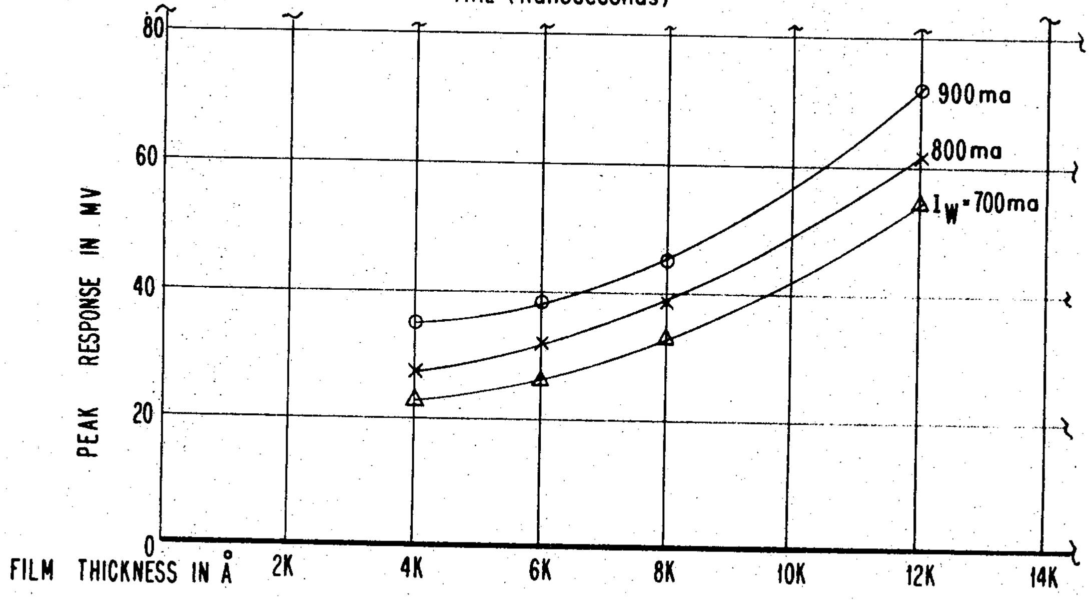
FIG. 14 describes graphically the relationship experimentally observed between peak signal output in millivolts vs. film thickness and word drive current.

FIG. 14 is a plot for additional examples of cylindrical magnetic storage devices showing the relationships of peak response signal for various word currents as a function of thickness of the identical magnetic layers where other structural parameters are essentially the same as in the previous example and where word current $(I_W)$ has a rise time of approximately 10 nanoseconds.

It should be recognized that the response signal amplitude and word current are also directly proportional to the substrate diameter. A 5 mil rod will produce one-fourth the signal and require one-fourth the word current to operate.

While in the above examples a specific magnetic material having a specific ratio is specified, other magnetic materials can be used to practice the present invention. In addition, where NiFe materials within the group known as Permalloy are used, the ratios of NiFe can vary within the interval 70 percent≤Ni/Fe≤83 percent with the ratio of 80 percent Ni 20 percent Fe being preferred. When cobalt is utilized to increase the intrinsic anisotropy field of one or more of the film layers, a value of 10 percent by weight or less is preferred. A composition of 78 percent Ni 19 percent Fe 3 percent Co has been found to be satisfactory.

In another form of the first embodiment, the magnetic layers 52 & 53 of the memory element 50 are also both anisotropic with their easy axes parallel with the longitudinal axis of the substrates 51, and are antiparallel coupled; however, the nonmagnetic barrier layer 54 used to separate the films is nonconductive. In order to produce a signal output when magnetic switching takes place, the inner and outer anisotropic magnetic layers 52 & 53 are made from materials having substantially different intrinsic anisotrophy fields. For example, referring to FIG. 5, the inner magnetic layer 52 would be formed of a ferromagnetic material such as NiFe and Co having a coercive force and anisotrophy field of approximately 7.0 oersteds. The outer magnetic layer 53 would be made of an alloy comprising NiFe having a coercive force and anisotrophy field of approximately 4 oersteds.

In this embodiment, the barrier layer 54 could be a dielectric film such as silicon monoxide. The thickness of the dielectric film would be great enough to eliminate the magnetic exchange coupling between the magnetic layers, but need not be as thick as a conductive barrier layer since eddy current generation is not necessary to produce the rotation rate differential needed to generate an output signal in the bit-sense loop 56. In this particular embodiment, the rotation rate differential is achieved due to the inherently different magnetic properties of the anisotropic layers 52 & 53 as their respective magnetization vectors are rotated in the antiparallel manner from the easy axis toward their respective hard magnetic axes. However, the efficiency of the response excitation properties will not be as good as the first embodiment which utilizes identical films and a conductive barrier.

Figure 9:
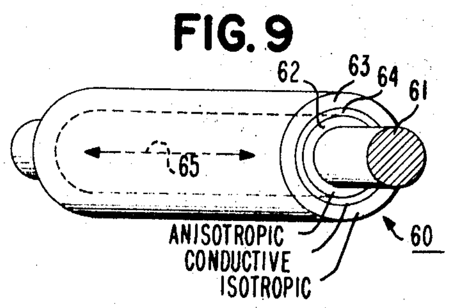
FIGS. 9 and 10 illustrate a second embodiment of a cylindrical magnetic film memory in which one of the magnetic film layers is anisotropic and the other is isotropic.

In FIG. 9, there is illustrated a second embodiment of the memory element 60 of this invention in which the concentric magnetic layers 62 & 63 on the conductive substrate 61 are isotropic and anisotropic, respectively. The magnetic layers 62 and 63 are separated by a conductive barrier layer 64. The preferred or easy axis 65 of saturation magnetization of the anisotropic film 63 is parallel to the axis of substrate 61. A longitudinal magnetization vector $M_{si}$ is induced in the isotropic layer 62 in a direction opposite to the magnetization vector $M_{sa}$ of anisotropic layer 63. Thus, antiparallel magnetic coupling is obtained which cancels the longitudinal demagnetizing field components in both films.

As is the case of the embodiment where both films are anisotropic, barrier layer 64 is made thick enough to permit circumferential eddy currents to flow therein. These eddy currents are generated in layer 64 by the rotation of the magnetization vectors $M_{si}$ and $M_{sa}$ within the film layers 62 & 63 when the memory element is subjected to a circumferential word magnetizing field produced by an axial word current $I_W$ in the conductive substrate 61. When the word field is applied, the magnetization vector $M_{si}$ of film 62 will start to rotate ahead of the magnetization vector $M_{sa}$ of film 63. However, as $M_{si}$ begins to rotate, it generates eddy currents in conductive barrier layer 64 which then acts as a solenoid to produce a solenoidal field which retards the rotation of $M_{si}$. Consequently, $M_{si}$ will lag behind $M_{sa}$, and the resultant phase difference produces a change in flux which will induce a signal voltage in a bit-sense loop (e.g. loop 56 of FIG. 7) associated with the memory element 60.

In the preferred embodiment of FIG. 9, the magnetic film layers 62 & 63 may be from 1000 A. to 50,000 A. thick and 10 mils or greater in length. The thickness of conductive barrier layer 64 is from 200 A. to approximately $5\times10^{13}L$, where $L$ is the discrete length of the magnetic layers 62 & 63 in mils.

In this second embodiment of the invention, both film layers 62 & 63 are preferably of the same magnetic thickness. However, by using the magnetic antiparallel coupling and cylindrical shape of this invention, where one of the films which possesses isotropic properties, the films may be of unequal thickness and the saturation magnetization may be unequal so long as the following equation is satisfied:

$$M_{s_a} t_a = M_{s_i} t_i \cos \qquad \text{eq. (3)}$$

where:

- $M_{s_a}$ is the saturation magnetization of the anisotropic film layer,
- $M_{s_i}$ is the saturation magnetization of the isotropic film layer,
- $t_a$ and $t_i$ are the thickness of the anisotropic and isotropic film layers, respectively,
- $\Theta_i$ = rest angle between longitudinal axis of the cylindrical rod and magnetization vector of the isotropic film layer.

In another form of this embodiment of the invention, the barrier layer may be as thin as 200 A. which is that value sufficient to eliminate exchange coupling between the magnetic films. However, with such a thin barrier layer, sufficiently large eddy currents are not produced therein to cause the vector $M_{s_i}$ to lag behind vector $M_{s_a}$ when the memory element is subjected to the word field $H_W$. The resultant phase displacement produces a change in flux which may be detected by a suitable sense conductor. In this form, the barrier layer need not be conductive.

Figure 10:
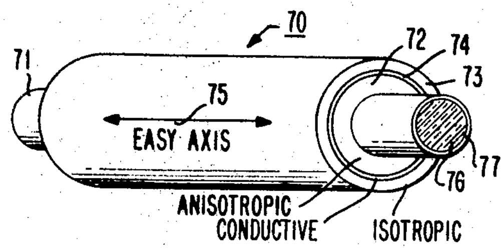

FIG. 10 shows a memory element 70 in which the inner magnetic film layer 72 is anisotropic having a longitudinal easy axis 75 and the exterior film 73 is isotropic, which is the reverse arrangement shown in memory element 60 of FIG. 9. In addition, the substrate 71 comprises a solid dielectric core 76 on which is deposited a conductive film 77. The operation of the memory element in FIG. 10 is similar to that in FIG. 9 in that a solenoid field is generated by circumferential eddy currents within the conductive barrier layer 74 to retard the rotation of the magnetization vector $M_{s_a}$ of the film 72. Since the magnetization vector $M_{s_i}$ of the film of isotropic film 73 tends to lead the vector $M_{s_a}$ of film 72 when current $I_W$ is applied to conductor 77, the delay produced by the longitudinal solenoid field from barrier layer 74 tends to produce an even greater phase differential between $M_{s_a}$ and $M_{s_i}$ and the sense signal $E_O$ in a bit-sense loop would be accordingly modified.

Figure 11:
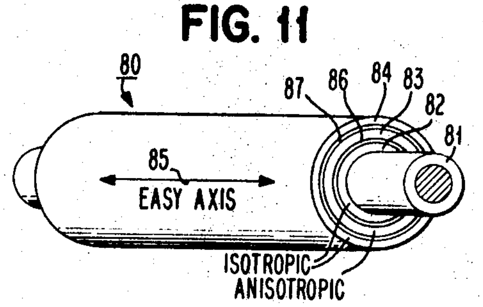
FIG. 11 is another embodiment of the invention in which the isotropic film is split into two layers on either side of the anisotropic film.

FIG. 11 shows a memory element 80 which illustrates a further embodiment of the invention using three concentric layers 82, 83, & 84 deposited on a hollow cylindrical conductive substrate 81. The inner and outer layers 82 and 84, respectively, are both isotropic while the sandwiched layer 83 is anisotropic with its easy axis 85 parallel to its longitudinal axis of the substrate 61. Conductive barrier layers 86 & 87 separate the anisotropic layer 83 from the isotropic layers. An induced antiparallel magnetic coupling is produced between the magnetic layers such that the magnetization vectors of the isotropic layers 82 & 84 are mutually parallel with the longitudinal axis of the conductor 81. In this embodiment, the combined thickness of the isotropic layers 82 & 84 is at least equal to, but can be greater than, the thickness of the anisotropic layer 83. This is to assure that the induced angular velocity of the magnetization vectors within the isotropic film layers 82 & 84 will rotate at a faster angular rate than that within the anisotropic film layer 83. The angular rotation rate in the isotropic film layers 82 & 84, when an energizing word current $I_W$ is applied to conductor 81, can reach up to four times that within the anisotropic layer 83 as a result of the division of the isotropic layer by the anisotropic layer when the thickness ratio specified above is maintained. To obtain a measure of control over the signal output conductive barrier layers 86 & 87 operate to modify the rotation rates within the inner layers 82 & 83.

Figure 12:
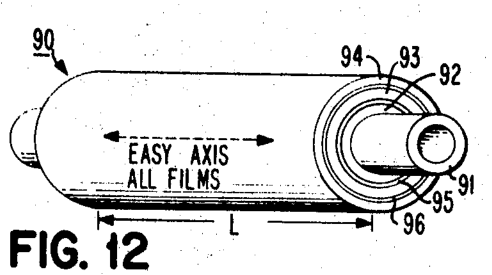
FIG. 12 is another embodiment of the invention having multiple anisotropic film layers.

FIG. 12 shows a memory element 90 which illustrates still another embodiment of the invention in which two uniaxial magnetic film layers 92 and 93 act in combination as a magnetostatic keeper for uniaxial magnetic film layer 94. All easy magnetic axes of magnetization are parallel with the longitudinal axis of the substrate. Conductive barrier layers 95 and 96 decouple the exchange forces between film layers 92 and 93 and 94 respectively. Magnetization within magnetic films 92 and 93 are mutually parallel and are oriented antiparallel with magnetization within magnetic layer 94. The magnetostatic requirements of this embodiment are satisfied in accordance with the following equation:

$$Ms_{92}\,St_{92}+Ms_{93}\,St_{93}=Ms_{94}\,St_{94} \qquad \text{eq. (4)}$$

Where $Ms_{92}$ is the magnetization vector of layer 92

$Ms_{93}$ is the magnetization vector of layer 93

$Ms_{94}$ is the magnetization vector of layer 94

$St_{92}$ $St_{93}$ and $St_{94}$ are the thickness of the layers 92, 93, & 94, respectively.

The operation of this device is quite similar to the operation of the first embodiment of the invention as shown in FIG. 7. The principal difference lies in control of the wall motion properties within layers 92 and 93 which are effective when changing states during writing. The preferred design for this embodiment is the magnetic thickness of films 92 and 93 are to be equal and that their combined thickness satisfy eq. (4). The conductive barrier layers 95 and 96 need not be equal in thickness and should satisfy the exchange decoupling criteria set forth in previous paragraphs of this description.

Figure 15:
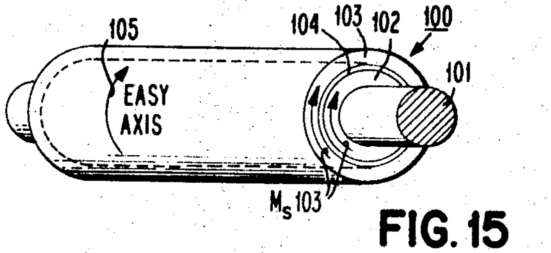
FIG. 15 shows another embodiment of the invention in which dual concentric magnetic film layers have circumferential preferred magnetic orientation axes separated by a barrier film.

In FIG. 15, the memory element 100 has a conductive cylindrical substrate 101 on which are deposited a pair of concentric magnetic layers 102 & 103 separated by a nonmagnetic barrier layer 104. In this embodiment, the magnetic layers 102 & 103 are uniaxially anisotropic with their preferred or easy axis 105 directed circumferentially relative to the substrate 101. The memory element is thereby characterized as having a closed easy axis for both magnetic layers 102 & 103. The barrier layer 104 is preferably copper. In this embodiment, magnetization vectors $Ms_{102}$ and $Ms_{103}$ are parallel for use in storing data and the barrier layer 104 is relatively thin to permit transverse wall coupling whereby the magnetization vectors rotate together upon application of a word pulse. In this embodiment, the substrate serves as a bit-sense line while the word lines, (not shown) which would take the same form as the bit-sense conductive loop 56 of FIG. 7, are orthogonal to the substrate 101. In this embodiment, the magnetic layers are preferably of equal magnetic thickness and have substantially identical magnetic properties and are formed from NiFe alloys or the like. While two magnetic layers are shown in FIG. 14, additional concentric layers in even numbers of magnetic films may be applied. The magnetic films preferably have a coercive force $H_C$ which is equal to or less than the anisotropy field $H_K$ of the material deposited. The barrier film is preferably fine grain copper deposited with a thickness in the range of from 100 to 1000 A. with the preferred thickness being about 600 A. The total thickness of the magnetic layers comprising magnetic storage device 100, is preferably in the order of 6000 A. If it is desired to have a magnetic film of greater thickness to get increased signal amplitudes, additional layers in even multiples are provided. With the above construction, magnetic elements 100 exhibit good disturb properties where alternating noise signal currents appear on the substrate when multiple data magnetic bits appear on a common line in a word organized DRO memory. While the specific reason for this is not completely understood, it is believed that the thin barrier layer permits transverse wall coupling between magnetic layers 102 & 103 thereby preventing Bloch wall creeping when disturb signal fields appear.

While various techniques for depositing the various film layers are known, the preferred techniques for making the cylindrical elements employs an electroless bath comprised of an aqueous solution of Iron and nickel salts in the presence of reducing agents such as sodium hypophosphite and a complexing agent such as sodium potassium tartrate. The bath preferably includes added amounts of $NH_4C1$ and $NH_4OH$ with a pH adjusted to be in the range of 7—13 preferably at about 10.5 while the temperature of the bath is maintained within the range of 15—45° C. with 32°—38° preferred. For depositing NiFeCo layers, a cobalt salt is added to the solution. Further details of suitable electroless baths and a method of preparation can be obtained by preference to copending application Ser. No. 678,890 of H. N. Rader, A. W. Vinal, and L. R. Yetter, filed on Oct. 30, 1967, and assigned to the common assignee.

While various techniques may be used to produce isotropic characteristics to the various layers, one technique alternately applies circumferential and longitudinal magnetizing fields to the cylindrical article while plating isotropic film layers. The longitudinal field component is derived from a Helmholtz coil pair. A circumferential field is developed at discrete intervals by a current which is caused to pan through the cylindrical substrate preferably with the hollow form shown in FIG. 11. Substantial magnetic isotropy can be obtained in a NiFe magnetic layer where said external magnetic fields are altered at a rate of once for each 100 A. or less throughout the deposition of the isotropic magnetic layer when using electroless deposition previously described. Likewise, uniaxiality is obtained by applying continuous external fields of fixed direction during deposition of the anisotropic magnetic layers.

Various methods may be devised to establish antiparallel magnetization vectors in the various magnetic storage devices. The preferred form, particularly in the embodiment of FIG. 5 where both magnetic layers have easy axes parallel with the substrate longitudinal axis, a word pulse is applied to and maintained on the word line; i.e., the conductive substrate (see FIG. 7) for a time duration great enough to be concurrent with a bit pulse sequence on the bit-sense line (FIG. 7), where a bit pulse is first applied in one direction and then reversed. This combination of pulses produces switching in the upper anisotropic layer of FIG. 5 while the magnetization vector of the bottom film is forced to the antiparallel state by the demagnetizing fields produced by the top film whose rest direction is defined by the polarity of the terminal bit pulse.

In the deposition of the copper barrier layers, a technique of electroplating is preferred in which fine grain copper is deposited electrolytically on the various magnetic layers. One such process for depositing the copper layers comprises applying a plating current density to the substrate of the memory element of 16 ma./in.$^2$ in an electrolytic copper bath formed from a mixture having a ratio of 107—644 g. of $Cu_2P_2O_7$ solution to which is added from 9—56 g. of NaCl. One such copper bath solution to which NaC1 is added is commercially available under the brand name of unichrome. The bath is maintained at a pH level slightly above 7; e.g., 7.75, and operated within a temperature range of 20—50° C.

In summary, the elimination of both hard and easy axis demagnetizing field components $H_D$ in the improved memory element of this invention produces the following advantages over the prior art: (1) Use of two thicker films which cooperate to produce larger sense signals because of the greater number of lines of flux which can be switched in response to the applied word field $H_W$; (2) Reduction of the value of the magnetizing field $H_W$, and consequently the energizing current $I_W$, required to switch the element; (3) Cancellation of orthogonal demagnetizing field components which otherwise would cause irreversible switching in portions of the film upon rotation of the magnetization vector toward the hard axis, which otherwise renders the device impractical for NDRO application; (4) Magnetostatic stabilization of the film in the unenergized states leading to a much greater percentage of the film capable of responding coherently to energization which could not occur when the demagnetizing field approaches the coercivity $H_C$ of the film throughout its cross section; (5) Provide an NDRO memory element capable of tolerating word current pulses which can exceed the intrinsic anisotrophy field of the storage film without the usual deleterious effect of losing the information states which may occur spuriously within a memory system, thus allowing the memory devices of this invention to be utilized in a reliable electrically alterable read-only memory configuration; (6) Provide an NDRO memory element capable of stable operation while experiencing stray fields of the order of 1 oersted or so, even if said stray fields are oriented parallel with the easy magnetic axis. This tolerance to stray fields eliminates the necessity to shield an array of memory elements from earth or other fields.

While the invention has been particularly shown and described with reference to preferred embodiments thereof, it will be understood by those skilled in the art that the foregoing and other changes in form and details may be made therein without departing from the spirit and scope of the invention.

I claim:

1. A bistable magnetic data storage device comprising:
a cylindrical conductive substrate of nonmagnetic material;
a data storage medium on said substrate comprising at least a first, second, and third closed, concentric, and longitudinally coextensive layers;
said first and third layers comprising an alloy including NiFe which is magnetic;
said first and third layers having a coercivity to anisotropy field ratio within the range of 0.5 and 1.3 and a skew angle not to exceed 3°;
said first and third layers being anisotropic with an easy axis orientation parallel with said axis of said substrate;
said first and third layers having magnetization vectors directed in antiparallel mode; and
said second layer which is between said first and third layers comprising nonmagnetic conductive materials, said second layer having a thickness thin enough to permit mutual coupling of the easy axis demagnetizing components of said magnetic layers and thick enough to eliminate magnetic exchange coupling between said magnetic layers and capable of sustaining circumferential eddy currents whereby a solenoidal whereby is generated parallel with the axis of said substrate upon rotation of the magnetization vectors of said first and third layers.

2. A bistable magnetic data storage device comprising:
a cylindrical substrate of conductive nonmagnetic material;
a data storage medium superimposed on said substrate comprising at least a first, second, and third circumferentially continuous, concentric and longitudinally coextensive layers;
said first and third layers comprising an alloy including NiFe;
said first and third layers each having an easy axis orientation substantially parallel with said longitudinal substrate; and
said second layer which is between said first and third layers comprising a material which is nonmagnetic and which forms a barrier layer between said first and third layers;
said second layer being thin enough to permit mutual coupling of the easy axis demagnetizing components of said magnetic layer and thick enough to substantially eliminate transverse magnetic exchange coupling between said magnetic layers.

3. A magnetic storage device in accordance with claim 2 in which said second layer has a thickness greater than 200 A.

4. A bistable magnetic data storage device in accordance with claim 2 in which said first and third magnetic layers have substantially equal anisotropy field strength; and
said second layer is a conductive material having a thickness further sufficient to sustain circumferential eddy currents whereby a solenoidal field is generated parallel with the axis of said substrate upon rotation of the magnetization vectors of said first and third magnetic layers.

5. A bistable magnetic data storage device in accordance with claim 2 in which said first and third magnetic layers have unequal anisotropy field strength.

6. A bistable magnetic data storage device in accordance with claim 5 in which said second layer is a conductive material.

7. A bistable magnetic storage device in accordance with claim 5 in which said second layer is a dielectric material.

8. A bistable magnetic data storage device comprising in combination:
a cylindrical substrate of conductive nonmagnetic material;
a data storage medium on said substrate comprising first, second, and third closed concentric magnetic layers;
said magnetic layers comprising an alloy including NiFe;
each of said magnetic layers having a preferred direction of magnetic orientation parallel with the axis of said substrate; and
said storage medium further comprising conductive barrier layers separating said magnetic layers;
said conductive barrier layers being thin enough to permit mutual coupling of the easy axis demagnetizing components of said magnetic layers and thick enough to substantially eliminate transverse magnetic exchange coupling between said magnetic layers;
said magnetic and said barrier layers being longitudinally coextensive.

9. A bistable magnetic data storage device in accordance with claim 8 in which said third layer is the outer layer and has a magnetic thickness substantially equal to the combined magnetic thickness of said first and second layers.

10. A bistable magnetic data storage element in accordance with claim 9 in which said first and second inner magnetic layers have magnetization vectors oriented parallel with each other and said third magnetic layer has a magnetization vector antiparallel with said magnetization vectors of said first and second layers.

PO-1050
(5/69)

UNITED STATES PATENT OFFICE
CERTIFICATE OF CORRECTION

Patent No. 3,576,552 Dated April 27, 1971

Inventor(s) Albert W. Vinal

It is certified that error appears in the above-identified patent and that said Letters Patent are hereby corrected as shown below:

Column 6, line 48, the formula reading $M_{s1} x AD_1 = M_{s2} x D_2$ eq. (2)

should read $M_{s1} x D_1 = M_{s2} x D_2$ eq. (2)

Column 10, line 8, the formula reading $M_{s_a} t_a = M_{s_i} t_i \cos$ eq. (3)

should read $M_{s_a} t_a = M_{s_i} t_i \cos \theta i$ eq. (3)

Claim 1, column 13, line 28, delete "having a thickness"; line 33, delete "whereby" after "solenoidal" and insert --field--.

Signed and sealed this 5th day of December 1972.

(SEAL)
Attest:

EDWARD M.FLETCHER,JR.
Attesting Officer

ROBERT GOTTSCHALK
Commissioner of Patent